(12) United States Patent
Kandola et al.

(10) Patent No.: US 12,245,302 B2
(45) Date of Patent: Mar. 4, 2025

(54) METHODS FOR IMPROVING WIRELESS CONNECTIONS FOR PREVIOUSLY PAIRED DEVICES

(71) Applicant: Bose Corporation, Framingham, MA (US)

(72) Inventors: Ranbir Kandola, Northborough, MA (US); Sara Sarkhili, Brookline, MA (US); Isaac Julien, Cambridge, MA (US); Eugene Zarkhin, Hudson, MA (US); Nathan A. Blagrove, Wayland, MA (US); Rodrigo Sartorio Gomes, Natick, MA (US); Matthew Leon, Cambridge, MA (US); Somasundaram Meiyappan, Chennai (IN)

(73) Assignee: Bose Corporation, Framingham, MA (US)

( * ) Notice: Subject to any disclaimer, the term of this patent is extended or adjusted under 35 U.S.C. 154(b) by 492 days.

(21) Appl. No.: 17/444,358

(22) Filed: Aug. 3, 2021

(65) Prior Publication Data
US 2023/0039972 A1 Feb. 9, 2023

(51) Int. Cl.
*H04W 4/00* (2018.01)
*H04W 4/80* (2018.01)
(Continued)

(52) U.S. Cl.
CPC ............ *H04W 76/15* (2018.02); *H04W 4/80* (2018.02); *H04W 88/04* (2013.01)

(58) Field of Classification Search
None
See application file for complete search history.

(56) References Cited

U.S. PATENT DOCUMENTS

2017/0163795 A1 6/2017 Kuang
2020/0008040 A1 1/2020 Lee
(Continued)

FOREIGN PATENT DOCUMENTS

CN 112272417 A * 1/2021 ............ H04W 4/80
CN 4138462 A1 * 2/2023 ............ H04W 12/06

OTHER PUBLICATIONS

The International Search Report and the Written Opinion of the International Searching Authority, PCT Application No. PCT/US2022/074228, pp. 1-10, dated Nov. 9, 2022.
(Continued)

*Primary Examiner* — Abdelillah Elmejjarmi
(74) *Attorney, Agent, or Firm* — Bond, Schoeneck & King, PLLC

(57) ABSTRACT

Methods and systems for easily establishing or switching between wireless connections by sending a Bluetooth Low-Energy (BLE) command from a first BLE enabled device to a second BLE enabled device, where the BLE command causes the second BLE enabled device to attempt to establish a Bluetooth Classic connection with one or more source devices from a list of source devices that have previously been paired with the second BLE device. The first BLE device is configured to obtain or receive the list from the second BLE device, and in response to one or more triggers, send the BLE command. The list of previously paired source devices may be presented to a user via a display screen with touch-screen functionality, and in some examples, may utilize one or more algorithms to intelligently order the available source devices based on a variety of factors.

20 Claims, 14 Drawing Sheets

(51) Int. Cl.
*H04W 76/15* (2018.01)
*H04W 88/04* (2009.01)

(56) References Cited

U.S. PATENT DOCUMENTS

| | | | |
|---|---|---|---|
| 2020/0128394 A1* | 4/2020 | Han | H04W 76/11 |
| 2021/0282207 A1 | 9/2021 | Cheong | |
| 2022/0217535 A1* | 7/2022 | Knaappila | G06F 21/31 |
| 2022/0394447 A1* | 12/2022 | Mangalam Srivatsa | H04M 1/72412 |
| 2022/0408505 A1 | 12/2022 | Zhu | |

OTHER PUBLICATIONS

International Preliminary Report On Patentability, International Patent Application No. PCT/US2022/074228, pp. 1-6, dated Feb. 6, 2024.

Final Office Action, U.S. Appl. No. 17/448,127, dated Nov. 7, 2024, pp. 1-12.

Non-Final Office Action, U.S. Appl. No. 17/448,127, dated May 7, 2024, pp. 1-11.

* cited by examiner

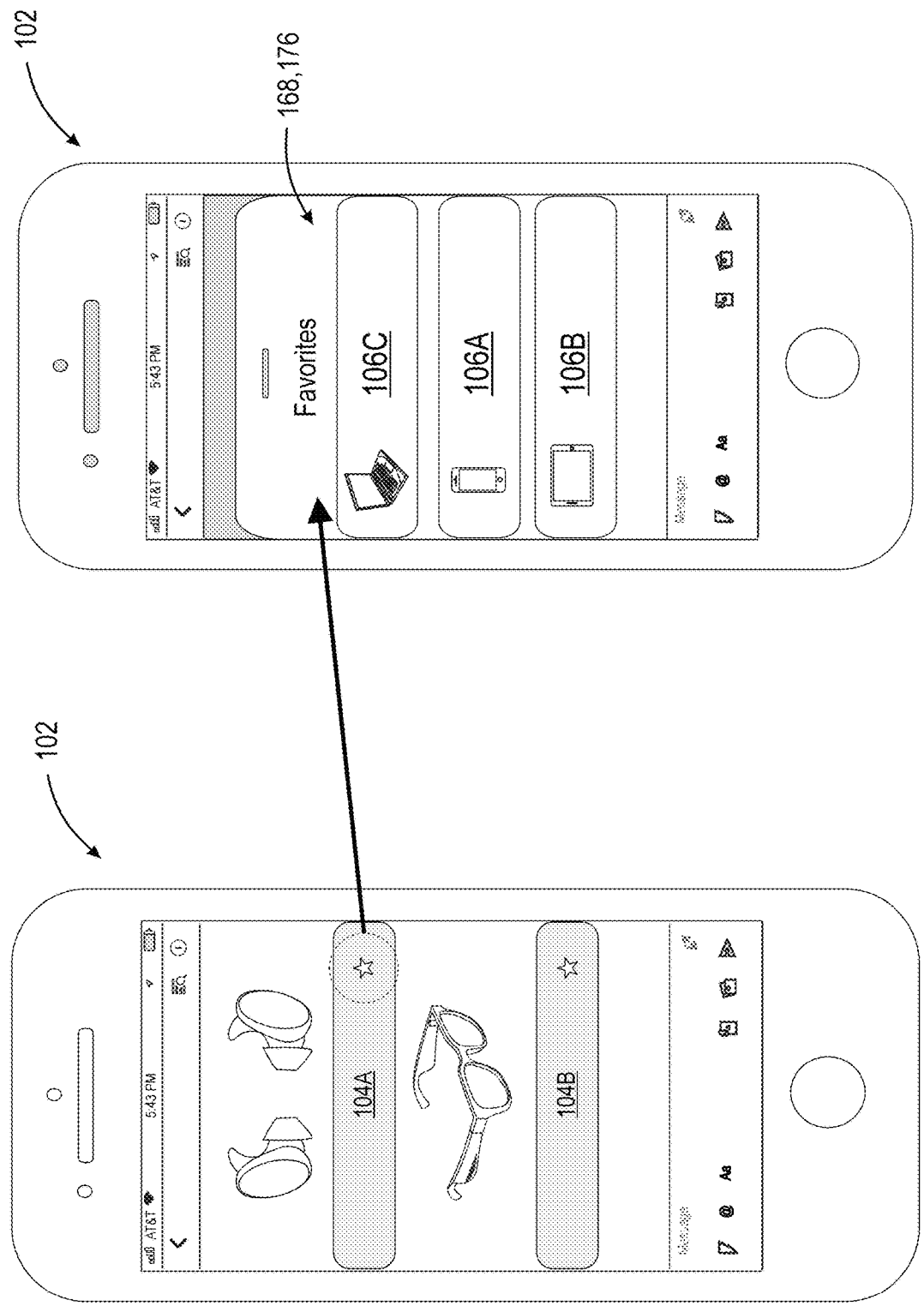

METHODS FOR IMPROVING WIRELESS CONNECTIONS FOR PREVIOUSLY PAIRED DEVICES

BACKGROUND

Aspects and implementations of the present disclosure are generally directed to systems and methods for improving wireless connections between wirelessly enabled devices, e.g., improving wireless connections between previously paired wirelessly enabled devices.

Wireless devices, for example, wearable audio devices such as wireless headphones or headsets, establish wireless connections with source devices based on direct commands sent from the source devices to the wearable audio device. This arrangement presents difficulties should the user wish to switch between source devices, e.g., a smartphone or a laptop, when a limited number of connections are available for multi-point support.

SUMMARY OF THE DISCLOSURE

The present disclosure provides methods and systems for easily establishing or switching between wireless connections by sending a Bluetooth Low-Energy (BLE) command from a first BLE enabled device to a second BLE enabled device, where the BLE command causes the second BLE enabled device to attempt to establish a Bluetooth Classic connection with one or more source devices from a list of source devices that have previously been paired with the second BLE device. The first BLE device is configured to obtain or receive the list from the second BLE device, and in response to one or more triggers, send the BLE command. The list of previously paired source devices may be presented to a user via a display screen with touch-screen functionality, and in some examples, may utilize one or more algorithms to intelligently order the available source devices based on a variety of factors.

Specifically, the systems and methods set forth herein include methods for quickly establishing or switching between connected source devices by sending a message, e.g., a BLE command, directing, e.g., a wearable audio device, to switch to a different source device. In some examples, the user can manually select a new source device, or intelligent algorithms that utilize GPS, time of day, and/or customer behavior to inform the connections made or alter the list presented to the user. Users can also establish favorites lists and manually organize the devices that will be presented under certain conditions. Furthermore, the devices described can leverage angle-of-arrival (AOA) or angle-of-departure (AOD) data gleaned via the BLE protocols to determine connection intent, e.g., should the user be facing or looking at a particular source device, connection decisions or the list of source devices can reflect a user preference for the source device that the user is looking at.

In one example, a method of establishing device connections is provided, the method including: receiving, at a first Bluetooth Low Energy (BLE) enabled device, a list of one or more source devices paired with a second BLE enabled device; and transmitting, in response to a trigger, a BLE command configured to cause the second BLE enabled device to attempt to establish a Bluetooth Classic connection with a source device from the list of one or more source devices paired with the second BLE enable device.

In an aspect, the first BLE enabled device does not have any other connection to the second BLE enabled device when the transmitting of the BLE command is performed.

In an aspect, the first BLE enabled device is a mobile computing device.

In an aspect, the first BLE enabled device is a case that is configured to matingly engage with the second BLE enabled device and/or configured to charge a battery of the second BLE enabled device.

In an aspect, the second BLE enabled device is a wearable audio device.

In an aspect, the second BLE enabled device is a speaker.

In an aspect, the second BLE enabled device is configured to relay the BLE command to a third BLE enabled device.

In an aspect, in response to the second BLE enabled device being unable to establish the Bluetooth Classic connection with a first source device from the list of one or more source devices, the second BLE enabled device is configured to attempt to connect to a second source device from the list of one or more source devices.

In an aspect, after receiving the list of one or more source devices and before transmitting the BLE command, the method further includes: selecting, via user input, the source device from the list of one or more source devices.

In an aspect, the user input includes a tap and hold input on a display of the first BLE enabled device.

In an aspect, the trigger is selected from at least one of: detection of the first BLE enabled device to within a first location; detection of the second BLE enabled device within the first location; detection of the first BLE enabled device being moved from the first location to a second location different than the first location; a time of day; detection that one or more source devices of the list of one or more source devices is within a wireless communication range of the first BLE enabled device; and detection of the activation of a user input.

In an aspect, the first BLE enabled device is configured to implement one or more algorithms arranged to generate the list of one or more source devices based on user behavior.

In an aspect, the one or more algorithms determines a relative angle-of-departure and/or a relative angle-of-arrival between the second BLE enabled device and one or more source devices of the list of one or more source devices.

In an aspect, the first BLE enabled device is configured to display a favorites list that includes one or more source devices from the list of one or more source devices.

In an aspect, the first BLE enabled device is the source device from the list of one or more source devices, and wherein the first BLE enabled device includes a user input, and wherein, the trigger includes activation of the user input such that, when the user input is activated, the first BLE enabled device is configured to send the BLE command to the second BLE enabled device and cause the second BLE enabled device to attempt to establish the Bluetooth Classic connection with the first BLE enabled device.

In another example, a Bluetooth Low Energy (BLE) enabled device is provided, the BLE enabled device including a BLE radio and a processor and memory configured to execute and store, respectively, a set of computer-readable instructions that when executed by the processor are configured to: transmit a BLE command via the BLE radio to request a list of one or more source devices paired with another BLE enabled device; and transmit, in response to a trigger, a BLE command to the other BLE enabled device such that the other BLE enabled device attempts to establish a Bluetooth Classic connection with a source device from the list of one or more source devices paired with the other BLE enabled device.

In an aspect, the BLE enabled device does not have any other connection to the other BLE enabled device when the transmitting of the BLE command is performed.

In an aspect, after transmitting the request and before transmitting the BLE command, the processor is further configured to: receive a user input; and select, based on the user input, the source device from the list of one or more source devices.

In an aspect, the trigger is selected from at least one of: detection of the BLE enabled device to within a first location; detection of the other BLE enabled device within the first location; detection of the BLE enabled device being moved from the first location to a second location different than the first location; a time of day; detection that one or more source devices of the list of one or more source devices is within a wireless communication range of the BLE enabled device; and detection of the activation of a user input.

In an aspect, the BLE enabled device is configured to implement one or more algorithms arranged to generate the list of one or more source devices based on user behavior.

In another example, a method of selecting a source device from a list of source devices is provided, the method including: receiving, at a first Bluetooth Low Energy (BLE) enabled device or a second BLE enabled device a user input configured to switch the first BLE enabled device or the second BLE enabled device into a first mode, the first mode corresponding to a manual or automatic series of attempts to establish Bluetooth Classic connections with one or more source devices from the list of source devices.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 7A is an illustration of a first BLE device and user interface according to the present disclosure.

FIG. 7B is an illustration of a first BLE device and user interface according to the present disclosure.

DETAILED DESCRIPTION OF EMBODIMENTS

The present disclosure provides methods and systems for easily establishing or switching between wireless connections by sending a Bluetooth Low-Energy (BLE) command from a first BLE enabled device to a second BLE enabled device, where the BLE command causes the second BLE enabled device to attempt to establish a Bluetooth Classic connection with one or more source devices from a list of source devices that have previously been paired with the second BLE device. The first BLE device is configured to obtain or receive the list from the second BLE device, and in response to one or more triggers, send the BLE command. The list of previously paired source devices may be presented to a user via a display screen with touch-screen functionality, and in some examples, may utilize one or more algorithms to intelligently order the available source devices based on a variety of factors.

Figure 1:
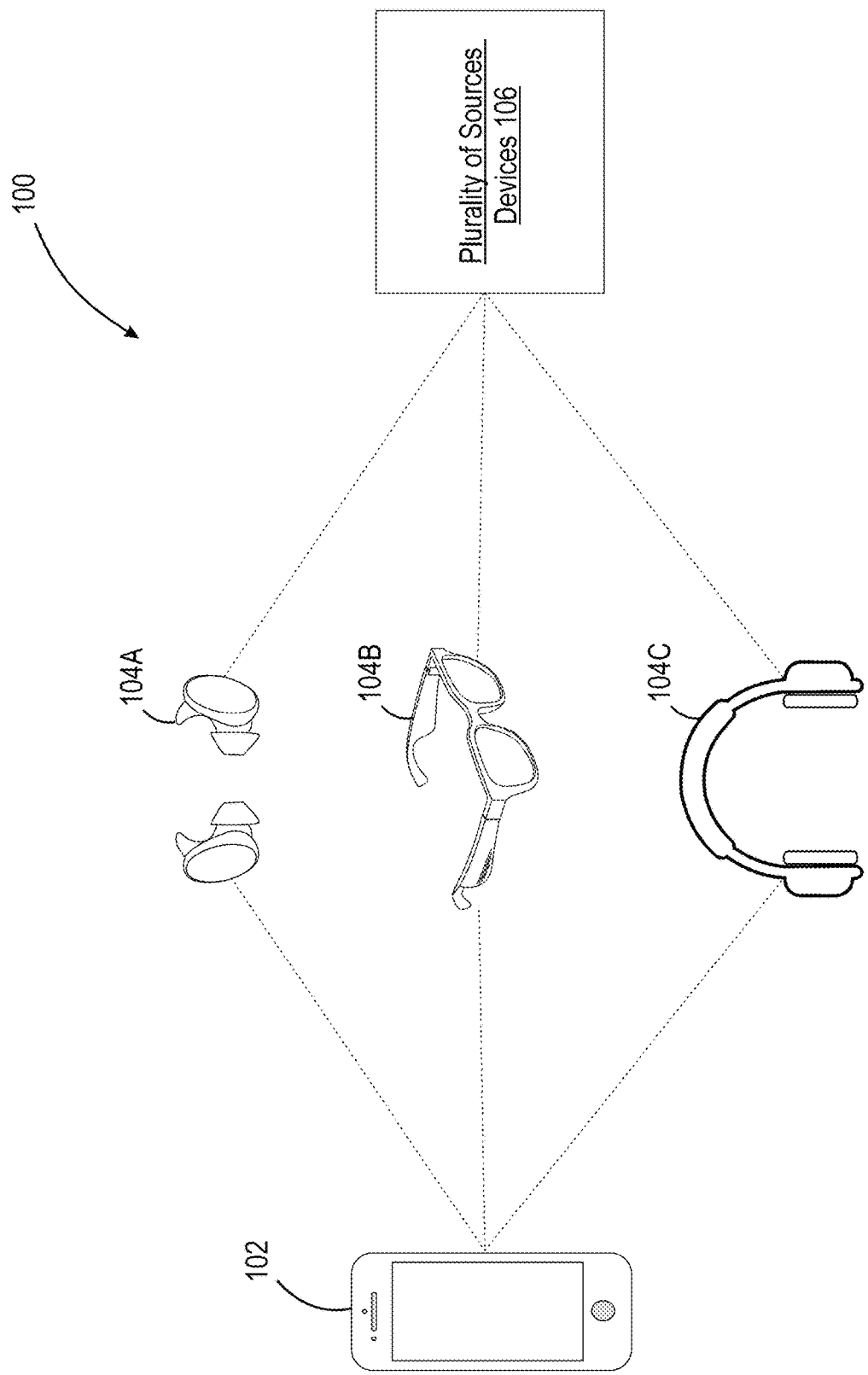
FIG. 1 is a schematic view of a system according to the present disclosure.

The term "wearable audio device" as used in this disclosure, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows examples of an in-the-ear headphone form factor, an eyeglass form factor, and an over-the-ear headset, in other examples the wearable audio device can be an on-ear, around-ear, behind-ear, or near-ear headset. In some examples, the wearable audio device can be an open-ear device that includes an acoustic driver to radiate acoustic energy towards the ear while leaving the ear open to its environment and surroundings.

The following description should be read in view of FIGS. 1-14. FIG. 1 is a schematic view of the components of system 100 according to the present disclosure. As illustrated, system 100 includes at least one first Bluetooth Low-Energy enabled device 102 (hereinafter "first BLE device 102") and at least one second Bluetooth Low-Energy enabled device 104 (hereinafter "second BLE device 104"). As illustrated, in one example, first BLE device 102 is a smartphone configured to establish one or more Bluetooth Low-Energy connections 164 (hereinafter "BLE connections 164" discussed below) with the one or more second BLE devices 104. As such, first BLE device 102 can be any device capable of establishing the one or more BLE connections 164, e.g., a smart phone, a tablet, a case configured to matingly engage with a wearable audio device, a speaker, a piece of exercise equipment, etc. Additionally, in some examples, the one or more second BLE devices 104, e.g., devices 104A-104C (collectively referred to as "second BLE devices 104"), are illustrated as a wearable audio device in the form of truly wireless ear (TWIE) buds, an eyeglass form-factor wearable audio device, and a headset form-factor wearable audio device. However, it should be appreciated that second BLE devices 104 can be selected from any device capable of establishing at least a BLE connection 164, and one or more Bluetooth Classic connections 166 (discussed below). Additionally, in some examples, the second BLE devices 104 can be selected from one or more devices capable of generating audible acoustic energy, e.g., an audio playback in response to data received through the BLE connection 164 or the Bluetooth Classic connection 166. As such, second BLE devices 104 can be selected from at least one of: a wearable audio device in the form of truly wireless ear (TWIE) buds, an eyeglass form-factor wearable audio device, and a headset form-factor wearable audio device; a standalone speaker, a speaker system, a smart speaker, a smart hub, an in-the-ear headphone form factor wearable audio device, an on-ear form-factor wearable audio device, an around-ear form-factor wearable audio device, a behind-ear form-factor wearable audio device, or a near-ear headset form-factor wearable audio device. As illustrated with respect to FIG. 12, in some example, system 100 may also include a third Bluetooth Low-Energy enabled device 178 (hereinafter "third BLE device 178", discussed below). It should be appreciated that the third BLE device 178 can be selected from at least one of any of the foregoing devices described above with respect to first BLE device 102 and second BLE device 104.

As shown schematically in FIG. 1, system 100 also includes a plurality of source devices 106. In some examples, as will be discussed below, each source device 106 is configured to establish one or more Bluetooth Classic connections 166 with one or more second BLE devices 104 in response to a BLE command 162. Although illustrated in FIG. 5B as a smartphone or tablet, source devices 106 can be selected from at least one of: a smart phone, a tablet, a personal computer such as a laptop or desktop computer, a printer, a smart television, a wearable audio device, a standalone speaker, a piece of exercise equipment, a wirelessly enabled case configured to matingly engage with one or more wearable audio devices, or any device capable of establishing a Bluetooth Classic wireless connection and capable of storing and wirelessly transmitting one or more media files over the Bluetooth Classic connection.

Figure 2:
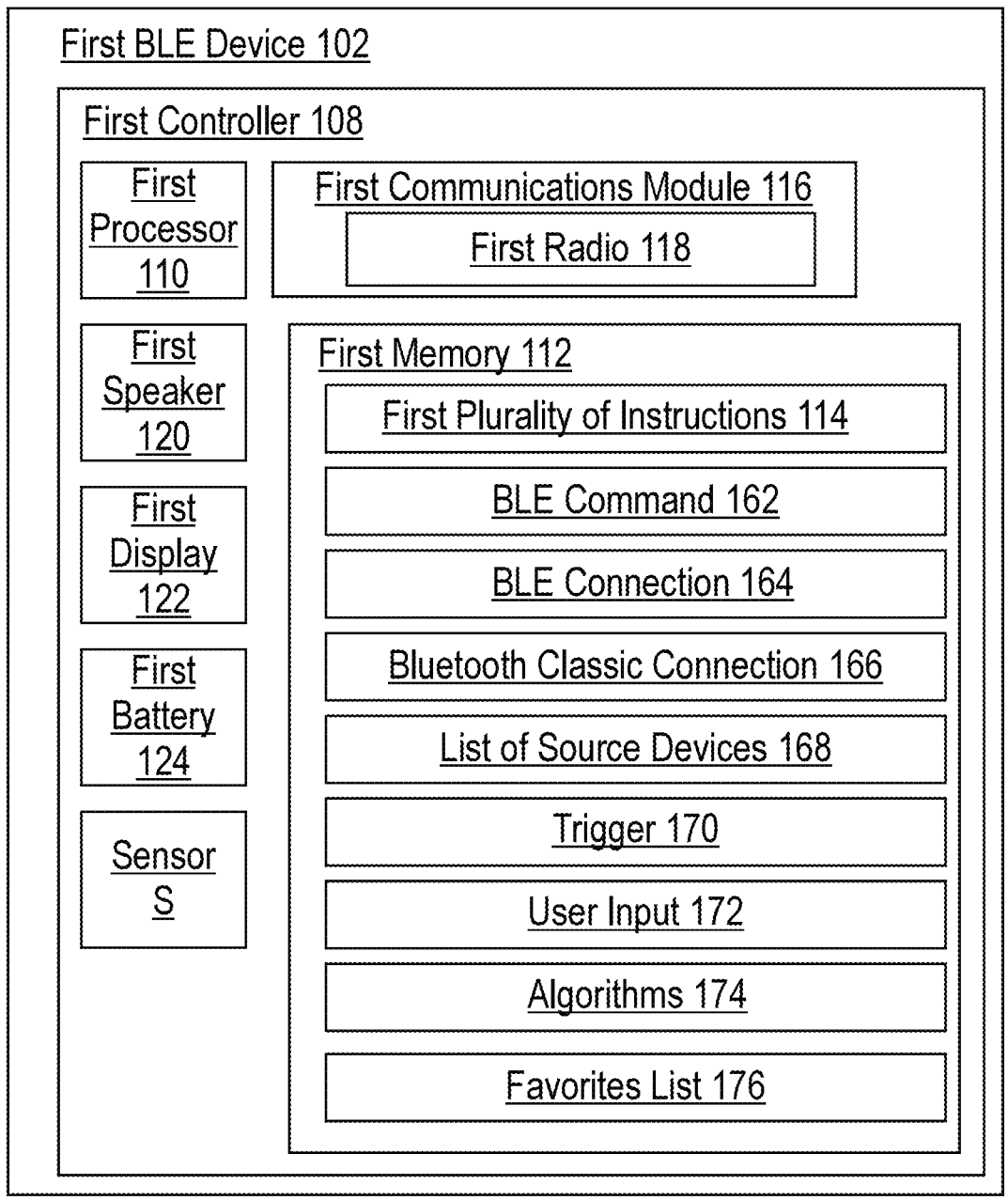
FIG. 2 is a schematic view of the components of a first BLE device according to the present disclosure.

As illustrated schematical in FIG. 2, each first BLE device 102 includes a first controller 108 which includes a first processor 110 and a first non-transitory memory 112 configured to execute and store, respectively, a first plurality of computer-readable instructions 114, to perform the various functions of first BLE device 102 as will be described herein. Each first controller 108 also includes a first communications module 116 configured to send and/or receive wireless data, e.g., data relating to at least one of the connections discussed below, e.g., BLE connections 164 or Bluetooth Classic connections 166. To that end, each first communications module 116 can include at least one radio or antenna, e.g., first radio 118, capable of sending and receiving wireless data. In some examples, first communications module 116 can include, in addition to at least one radio (e.g., first radio 118), some form of automated gain control (AGC), a modulator and/or demodulator, and potentially a discrete processor for bit-processing that are electrically connected to first processor 110 and first memory 112 to aid in sending and/or receiving wireless data. As illustrated in FIG. 2, it should be appreciated that each first BLE device 102 can also include at least one speaker, i.e., first speaker 120, which is, e.g., a loudspeaker or acoustic transducer, that is electrically connected to first processor 110 and first memory 112 and configured to electromechanically convert an electrical signal into audible acoustic energy within the environment surrounding each first BLE device 102, e.g., an audio playback. In some examples, the electrical signal and the audible acoustic energy are associated with the data included in the wireless connections discussed herein. Furthermore, each first BLE device 102 also includes a first display 122. First display 122 is intended to be a screen capable of displaying visual content to a user. In one example, first display 122 is a Liquid-Crystal Display (LCD) and may also include touch-screen functionality, e.g., is capable of utilizing resistive or capacitive sensing to determine contact with, and position of, a user's finger against the screen surface. It should also be appreciated that first display 122 can be selected from at least one of: a Light-Emitting Diode (LED) screen, an Organic Light-Emitting Diode (OLED) screen, a plasma screen, or any other display technology capable of presenting images, text, or video content to a viewer or user. Additionally, each first BLE device 102 can include a power source, e.g., a first battery 124, capacitor, or super capacitor capable of storing electrical potential energy sufficient to power first BLE device 102 through the functionality discussed herein. In some examples, discussed below, first BLE device 102 can also include one or more sensors S, where the one or more sensors S include at least one of: a gyroscope, accelerometer, magnetometer, Global Positioning Systems (GPS) sensor, and a daylight sensor.

Figure 3:
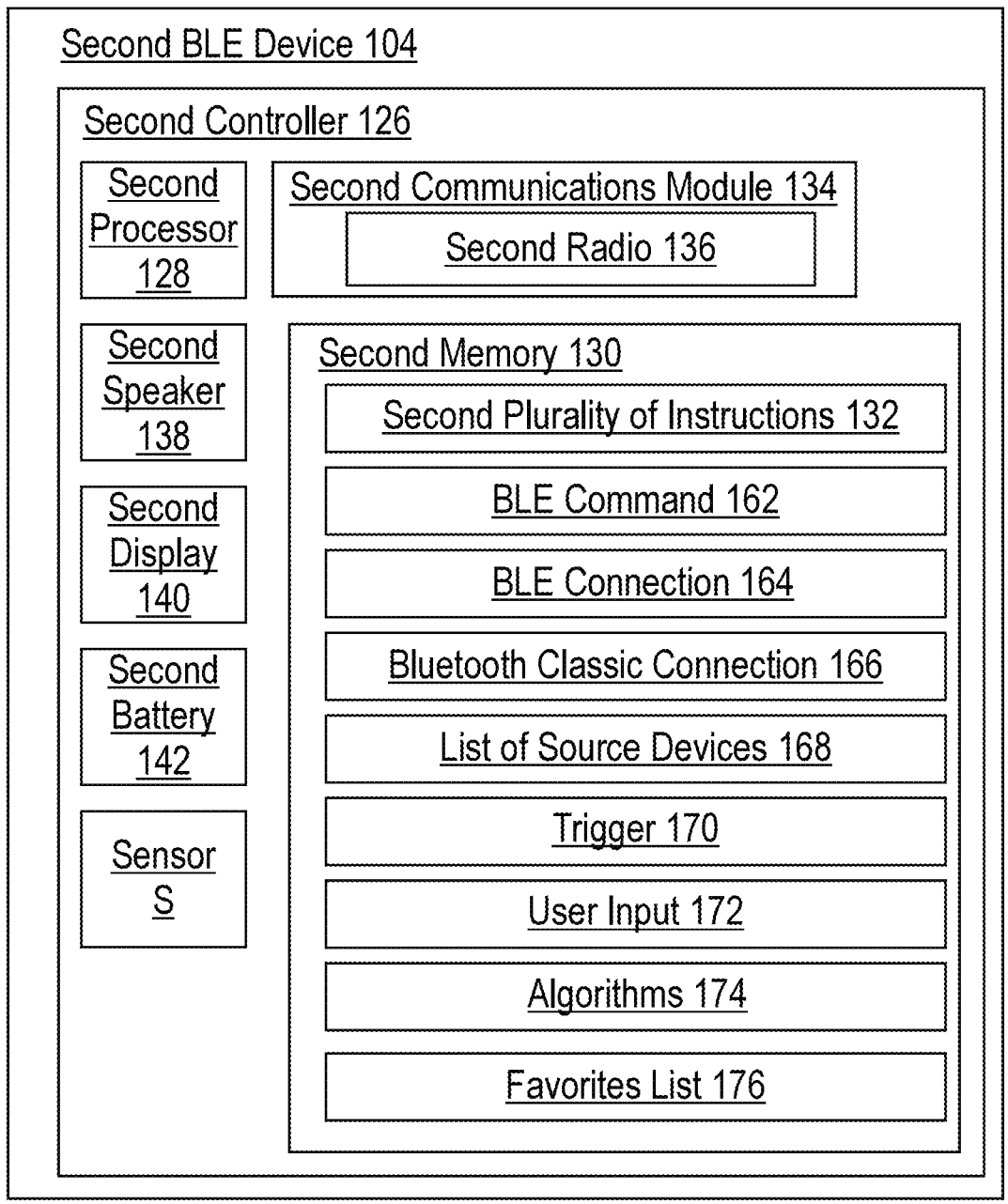
FIG. 3 is a schematic view of the components of a second BLE device according to the present disclosure.

Similarly, as illustrated schematically in FIG. 3, each second BLE device 104 includes a second controller 126 which includes a second processor 128 and a second non-transitory memory 130 configured to execute and store, respectively, a second plurality of computer-readable instructions 132, to perform the various functions of second BLE device 104 as will be described herein. Each second controller 126 also includes a second communications module 134 configured to send and/or receive wireless data, e.g., data relating to at least one of the connections discussed below, e.g., BLE connections 164 or Bluetooth Classic connections 166. To that end, each second communications module 134 can include at least one radio or antenna, e.g., second radio 136, capable of sending and receiving wireless data. In some examples, second communications module 134 can include, in addition to at least one radio (e.g., second radio 136), some form of automated gain control (AGC), a modulator and/or demodulator, and potentially a discrete processor for bit-processing that are electrically connected to second processor 128 and second memory 130 to aid in sending and/or receiving wireless data. As illustrated in FIG. 3, it should be appreciated that each second BLE device 104 can also include at least one speaker, i.e., second speaker 138, which is, e.g., a loudspeaker or acoustic transducer, that is electrically connected to second processor 128 and second memory 130 and configured to electromechanically convert an electrical signal into audible acoustic energy within the environment surrounding each second BLE device 104, e.g., an audio playback. In some examples, the electrical signal and the audible acoustic energy are associated with the data included in the wireless connections discussed herein. Furthermore, each second BLE device 104 can optionally include a second display 140. Second display 140 is intended to be a screen capable of displaying visual content to a user. In one example, second display 140 is a Liquid-Crystal Display (LCD) and may also include touch-screen functionality, e.g., is capable of utilizing resistive or capacitive sensing to determine contact with, and position of, a user's finger against the screen surface. It should also be appreciated that second display 140 can be selected from at least one of: a Light-Emitting Diode (LED) screen, an Organic Light-Emitting Diode (OLED) screen, a plasma screen, or any other display technology capable of presenting images, text, or video content to a viewer or user. Additionally, each second BLE device 104 can include a power source, e.g., a second battery 142, capacitor, or super capacitor capable of storing electrical potential energy sufficient to power second BLE device 104 through the functionality discussed herein. In some examples, discussed below, second BLE device 104 can also include one or more sensors S, where the one or more sensors S include at least one of: a gyroscope, accelerometer, magnetometer, Global Positioning Systems (GPS) sensor, and a daylight sensor.

Figure 4:
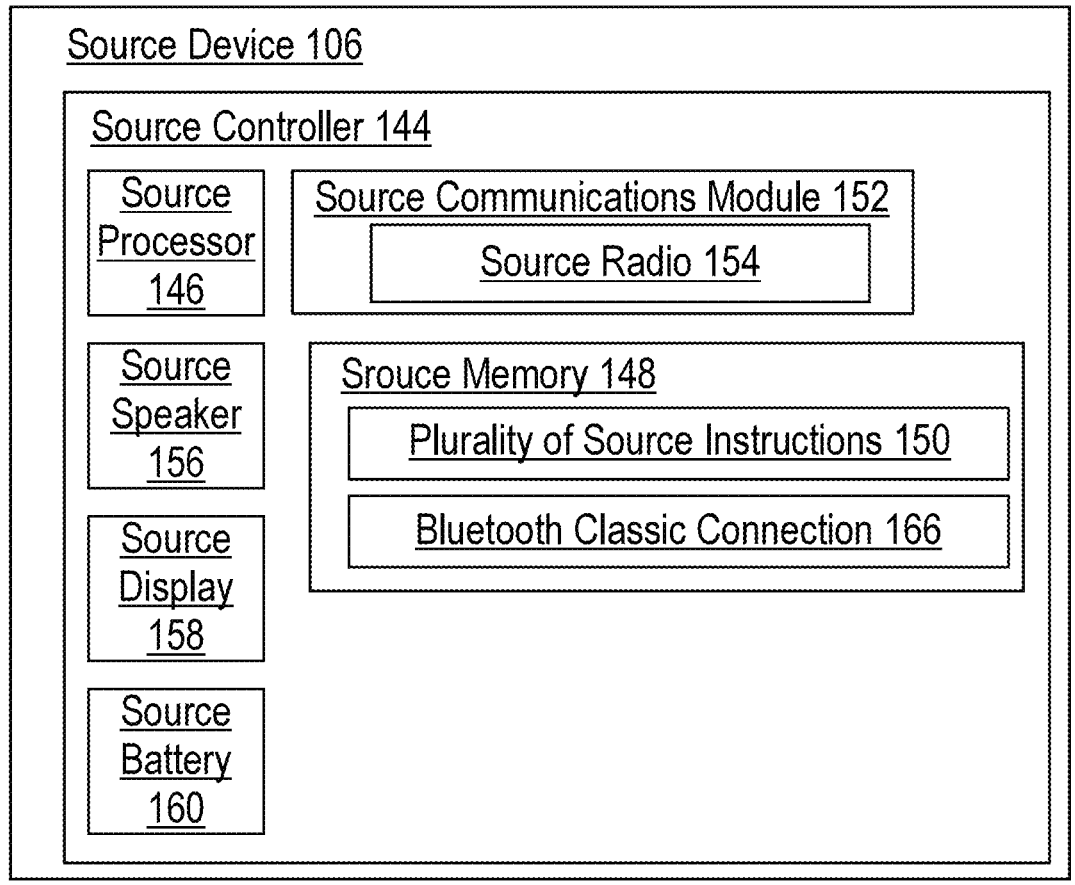
FIG. 4 is a schematic view of the components of source device according to the present disclosure.

Furthermore, as illustrated schematically in FIG. 4, each source device 106 includes a source controller 144 which includes a source processor 146 and a source non-transitory memory 148 configured to execute and store, respectively, a plurality of computer-readable source instructions 150, to perform the various functions of each source device 106 as will be described herein. Each source controller 144 also includes a source communications module 152 configured to send and/or receive wireless data, e.g., data relating to at least one of the connections discussed below, e.g., BLE connections 164 or Bluetooth Classic connections 166. To that end, each source communications module 152 can include at least one radio or antenna, e.g., source radio 154, capable of sending and receiving wireless data. In some examples, source communications module 152 can include, in addition to at least one radio (e.g., source radio 154), some form of automated gain control (AGC), a modulator and/or demodulator, and potentially a discrete processor for bit-processing that are electrically connected to source processor 146 and source memory 148 to aid in sending and/or receiving wireless data. As illustrated in FIG. 4, it should be appreciated that each source device 106 can also include at least one speaker, i.e., source speaker 156, which is, e.g., a loudspeaker or acoustic transducer, that is electrically connected to source processor 146 and source memory 148 and configured to electromechanically convert an electrical signal into audible acoustic energy within the environment surrounding each source device 106, e.g., an audio playback. In some examples, the electrical signal and the audible acoustic energy are associated with the data included in the wireless connections discussed herein. Furthermore, each source device 106 can optionally include a source display 158. Source display 158 is intended to be a screen capable of displaying visual content to a user. In one example, source display 158 is a Liquid-Crystal Display (LCD) and may also include touch-screen functionality, e.g., is capable of utilizing resistive or capacitive sensing to determine contact with, and position of, a user's finger against the screen surface. It should also be appreciated that source display 158 can be selected from at least one of: a Light-Emitting Diode (LED) screen, an Organic Light-Emitting Diode (OLED) screen, a plasma screen, or any other display technology capable of presenting images, text, or video content to a viewer or user. Additionally, each source device 106 can include a power source, e.g., a source battery 160, capacitor, or super capacitor capable of storing electrical potential energy sufficient to power source device 106 through the functionality discussed herein.

In some example embodiments, the devices set forth above, e.g., first BLE device 102, second BLE device 104, and source devices 106, are configured to send and receive wireless data between each other using one or more wireless data protocols. In some examples the wireless data protocols are selected from at least one of: a Bluetooth Classic protocol, a Bluetooth Low-Energy protocol, or an LE Audio protocol. In some examples, first BLE device 102 is configured to send or transmit a Bluetooth Low-Energy command 162 (hereinafter "BLE command 162") to second BLE device 104. This command can be broadcast by the first BLE device 102 such that any Bluetooth Low-Energy enabled device within the broadcast radius can receive the BLE command 162 with or without establishing a more robust communication stream or connection prior to sending. In other words, first BLE device 102 and second BLE device 104 do not need to have previously established a BLE connection 164 to send and receive the BLE command 162. As used throughout the present disclosure, and in addition to its ordinary meaning to those of skill in the art, the transmission of the BLE command 162 from one BLE enabled device to another is referred to as a "BLE connection 164" regardless of whether a more robust bi-directional communication stream has been established. Additionally, and in response to receiving the BLE command 162 from the first BLE device 102, the second BLE device 104 is configured to establish a Bluetooth Classic connection 166 between the second BLE device 104 and one or more source devices 106 based at least in part on the BLE command 162. The Bluetooth Classic connection 166 includes the establishment of one or more bi-directional communication streams between one or more second BLE devices 104 and one or more source devices 106 using the Bluetooth Classic protocol. Therefore, it should be appreciated that first BLE device 102 can send the BLE command 162 while having no other connection with second BLE device 104.

In some examples the first BLE device 102 is configured to receive a list 168 of source devices 106 that the second BLE device 104 has previously paired with, i.e., has established a previous Bluetooth Classic connection 166 with. The list 168 is sent from a given second BLE device 104 to the first BLE device 102 via the BLE connection 164, or via one or more BLE advertising packets broadcast by second BLE device 104. In some examples, once received, the list 168 can be displayed on first display 122 of first BLE device 102. In other examples, the list 168 is stored in first memory 112 of first BLE device 102 for future use.

As will be discussed below, in response to a triggering event, e.g., trigger 170, the first BLE device 102 is configured to send the BLE command 162 to the second BLE device 104 which causes the second BLE device 104 to establish a Bluetooth Classic connection 166 with one or more source devices 106 from the list 168 of source devices that have previously been paired with the given second BLE device 104. Triggers 170 include but are not limited to at least one of: detection of the first BLE device 102 within a first location L1 (shown in FIG. 10); detection of the second BLE device 104 within the first location L1; detection of the first BLE device 102 being moved from the first location L1 to a second location L2 (shown in FIG. 11) different than the first location L1; a time of day; detection that one or more source devices 106 of the list 168 of one or more source devices 106 is within a wireless communication range of the first BLE device 102. In some examples, the trigger 170 can include receiving a user input 172. For example, trigger 170 can include a detection of a tap or tap and hold of the user's finger on a portion of first display 122 of first BLE device 102. Additionally, and although not illustrated, trigger 170 can be a physical button, switch, lever, or touch capacitive sensor disposed on first BLE device 102, second BLE device 104, or source device 106. As will be described below, upon detection of one or more triggers 170, the first BLE device 102 is configured to send a BLE command 162 to the second BLE device 104 instructing the second BLE device 104 to attempt to establish a Bluetooth Classic connection 166 with one or more source devices 106, or switch between connected source devices 106. Additionally, in some examples, should the attempt to establish a Bluetooth Classic connection 166 with a first source device 106 fail, the systems and methods set forth herein can automatically attempt to establish a Bluetooth Classic connection 166 with a second source device 106 from the list 168 of source devices.

Figures 5A, 5B:
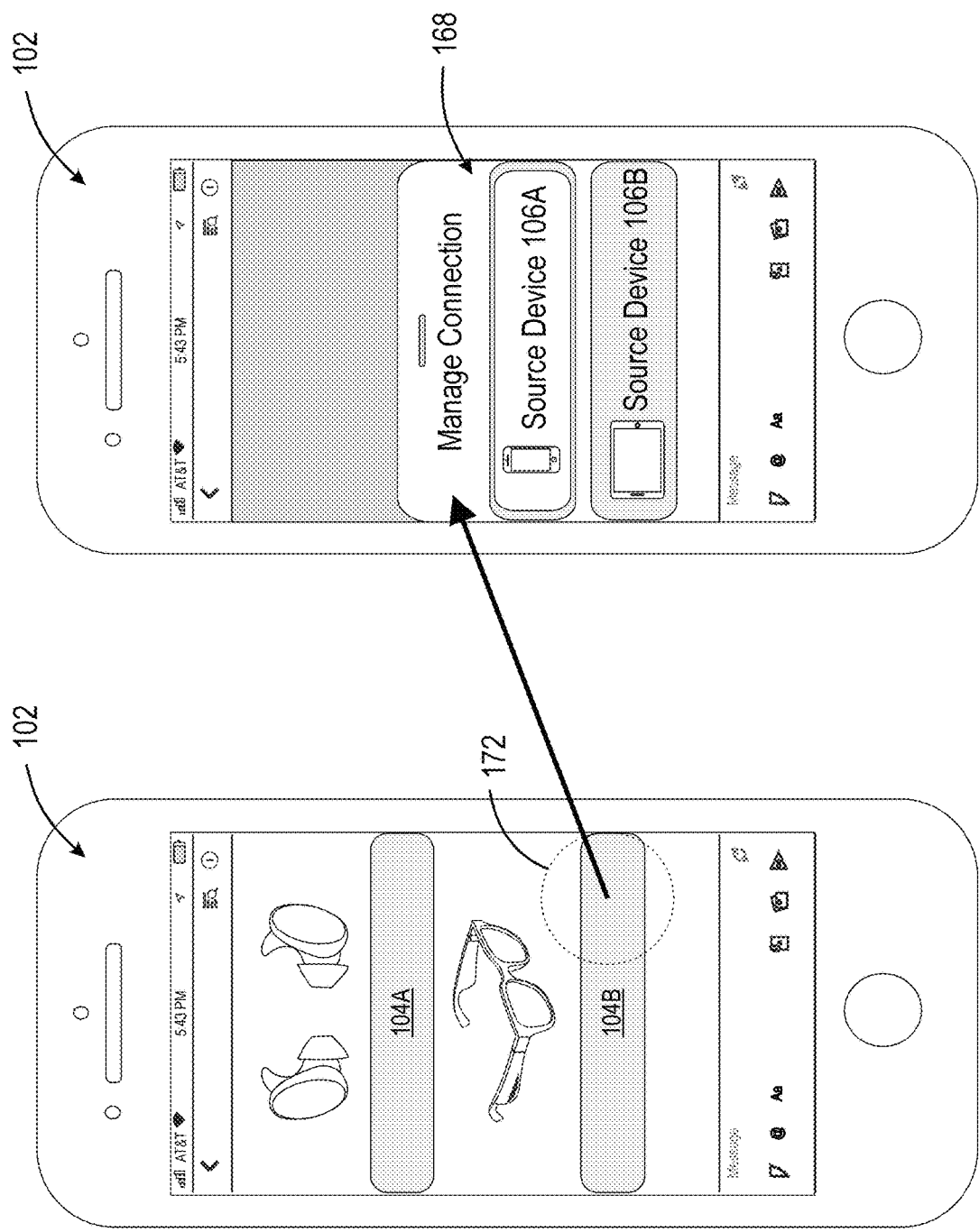
FIG. 5A is an illustration of a first BLE device and user interface according to the present disclosure.
FIG. 5B is an illustration of a first BLE device and user interface according to the present disclosure.

FIGS. 5A-5B show one example of system 100, wherein the first BLE device 102 is a smart phone with first display 122 illustrated as an LCD display screen with touch-screen functionality. As shown in FIG. 5A, first BLE device 102 is configured to generate a graphical user interface and display that interface to the user via first display 122. As shown, the user interface can display a visual list of available devices, e.g., a list of available second BLE devices 104. FIG. 5A shows two available second BLE devices, e.g., second BLE device 104A illustrated as a pair of TWIE earbuds and second BLE device 104B illustrated as a wearable audio device having an eyeglass form-factor. The displayed devices may be the devices that are within range of a given BLE connection 164 and are capable of receiving a BLE command 162. Optionally, the devices displayed can include devices that are outside of an acceptable range for sending and receiving data via a BLE connection 164. During operation, a user can provide a user input 172, e.g., by tapping or tapping and holding a portion of first display 122. In the example illustrated the user can tap and hold on the tile associated with second BLE device 104B or on the image of the wearable audio device with an eyeglass form-factor. Once the user input 172 is provided, the graphical user interface can change to the menu illustrated in FIG. 5B, which provides a list 168 of source devices 106A-106B that second BLE device 104B has previously paired with, i.e., previously established a Bluetooth Classic connection 164 with. As shown, the list 168 includes source device 106A (shown as a smartphone) and a source device 106B (shown as a tablet). Within the list 168 of source device 106A-106B, the user can select one or more of the source device 106 to send a BLE command 162. This second user input 172 (not shown) operates as a trigger 170 to send a BLE command 162 to establish a Bluetooth Classic connection 166 with the selected source device 106. Thus, in the example illustrated in FIGS. 5A-5B, the user can tap or tap and hold the tile associated with second BLE device 104B (shown in FIG. 5A), which prompts the user with a list 168 of source devices 106 that second BLE device 104B has previously paired with. From this list 168 (shown in FIG. 5B), the user can provide a second user input by tapping or tapping and holding one of the source devices 106 from the list, e.g., source device 106 (which illustrates a tablet device). The selection of source device 106B from the list constitutes a trigger 170 which results in first BLE device 102 sending or transmitting a BLE command 162 to second BLE device 104B which causes second BLE device 104B to establish a Bluetooth Classic connection 166 with source device 106B.

Additionally, in presenting the list 168 of source devices 106 that a particular second BLE device 104 has previously paired with, one or more devices of the present disclosure can store and execute computer code associated with one or more algorithms 174 that when executed operate to prioritize, order, or otherwise organize the source devices 106 within the list 168 in an attempt to anticipate user preference. For example, as illustrated in FIG. 6A, one or more algorithms 174 (shown in FIGS. 2-3) can obtain, compile, and analyze data related to the user's preferences in selecting, using, or connecting with certain source device 106A-106C. For example, collected usage data can indicate that the user routinely uses their smartphone (source device 106A) for longer periods of time than the user's tablet (source device 106B) and that the user routinely uses their tablet for longer periods of time than their laptop (source device 106C). Given this distribution of usage data, the one or more algorithms 174 can order source devices 106A-106C with the most used device (106A) at the top of the list 168 and the least used device (106C) at the bottom of the list 168. It should be appreciated that the one or more algorithms 164 can utilize machine learning techniques and can be trained using supervised or unsupervised training techniques.

Figure 6B:
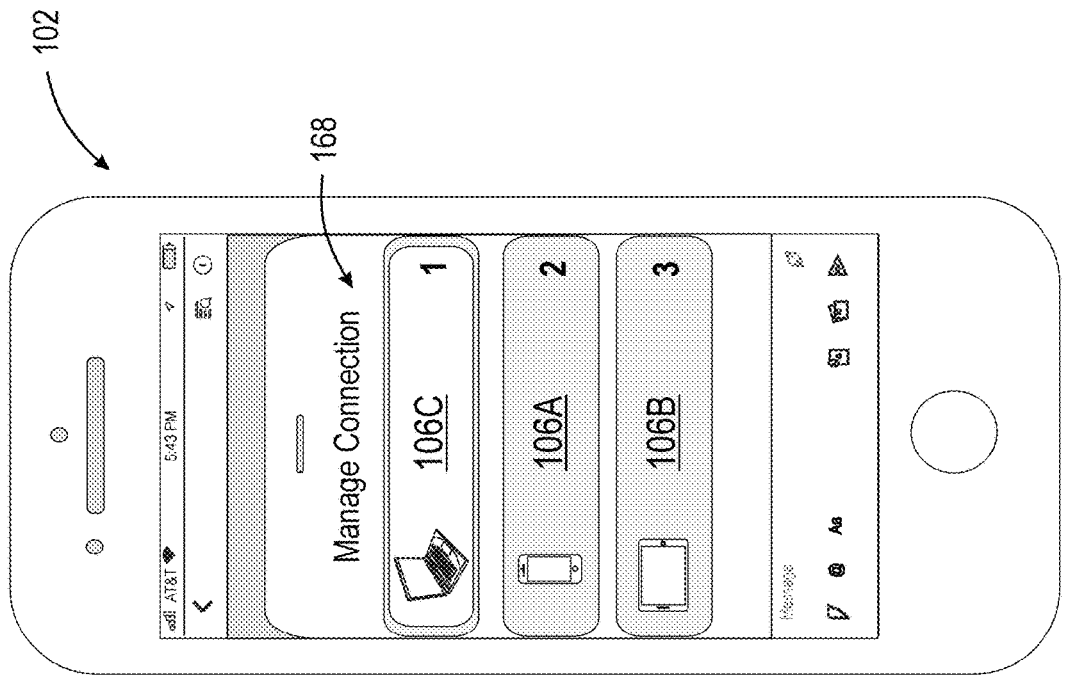
FIG. 6B is an illustration of a first BLE device and user interface according to the present disclosure.
Figure 6A:
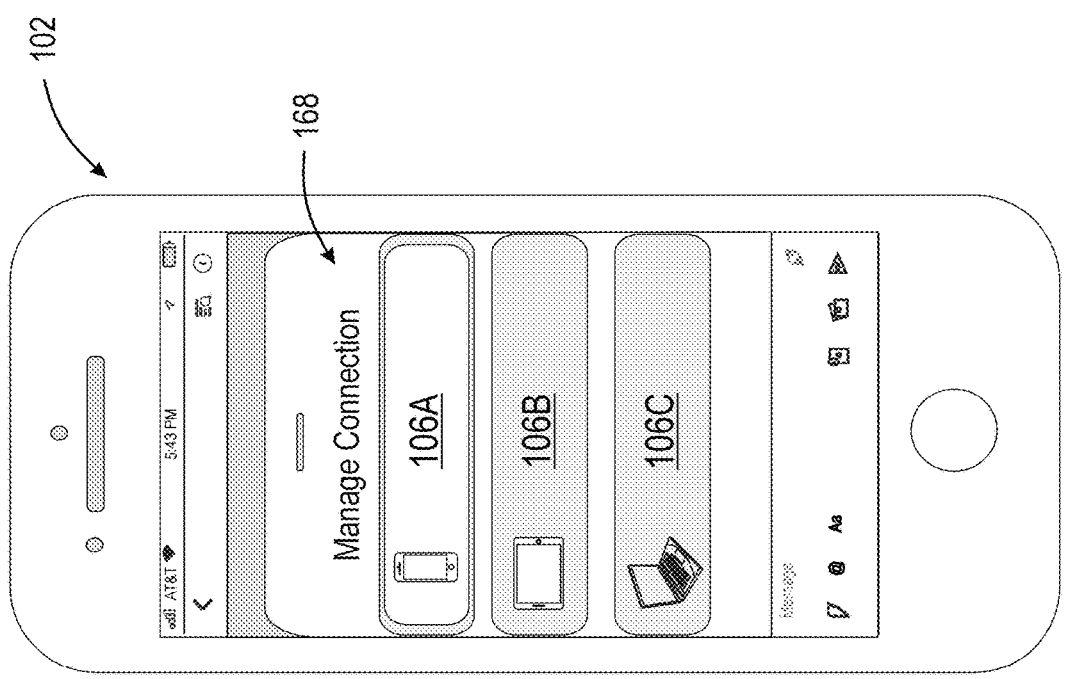
FIG. 6A is an illustration of a first BLE device and user interface according to the present disclosure.

As shown in FIG. 6B, in the alternative to or in addition to the list order provided by the one or more algorithms 174 above, the user can manually manipulate the order of the list 168 by placing a number (associated with the desired order) next to each source device 106 in the list 168. For example, the user can manually input a numerical value associated with each source device 106, where a lower numerical value indicates a preference that the associated source device 106 is presented higher on the list 168. In one example as shown in FIG. 6B, the user may wish to manually display source device 106C higher on the list 168 than any other previously paired source device. As such, the user can enter, e.g., using the touch screen keypad portion of first BLE device 102, a numerical value of "1" in association with source device 106C such that source device 106C is displayed as the first or top-most source device 106. Additionally, the user can designate a numerical value of "2" and "3" in association with source devices 106A and 106B, respectively, so that each device will be displayed in that order.

Alternatively to using one or more algorithms 174 and/or manual manipulation of displayed source devices 106, first BLE device 102 can present the user with a favorites list 176, e.g., a list of preselected source devices 106 that have previously been paired with each second BLE device 104. For example, as shown in FIG. 7A, each available second BLE device 104 can be associated with a favorites list 176, accessible to the user after they tap the portion of each tile that contains a star icon. As shown in FIG. 7B, once the user taps the star icon (shown in FIG. 7A), the user interface displayed visually generates the favorites list 176, i.e., the list of preselected source devices 106, associated with that second BLE device 104. In the example illustrated in FIGS. 7A-7B, the user taps the star icon next to second BLE device 104A (the user's truly wireless earbuds). Once selected, the favorites list 176 provides a list of preselected or predetermined sources. The user can then select one of the source devices 106 displayed in the favorites list 176. The selection of one of the source devices 106 from the favorites list 176 operates as a user input 172 and a trigger 170 that causes first BLE device 102 to transmit a BLE command 162 to second BLE device 104A instructing second BLE device 104A to establish a Bluetooth Classic connection 166 with the selected source device 106 from the favorites list 176.

Figure 8A:
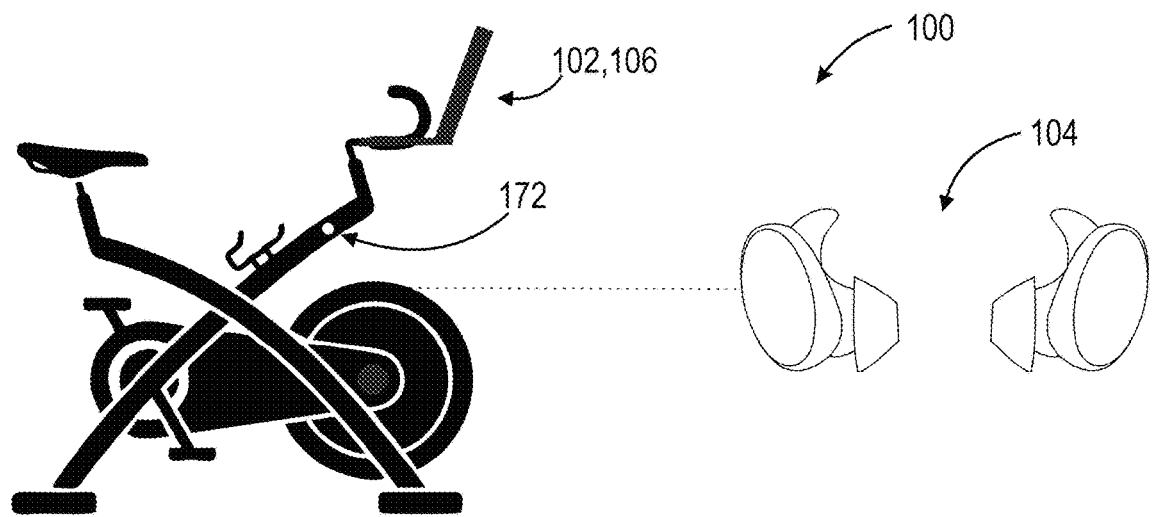
FIG. 8A is a schematic representation of a system according to the present disclosure.
Figure 8B:
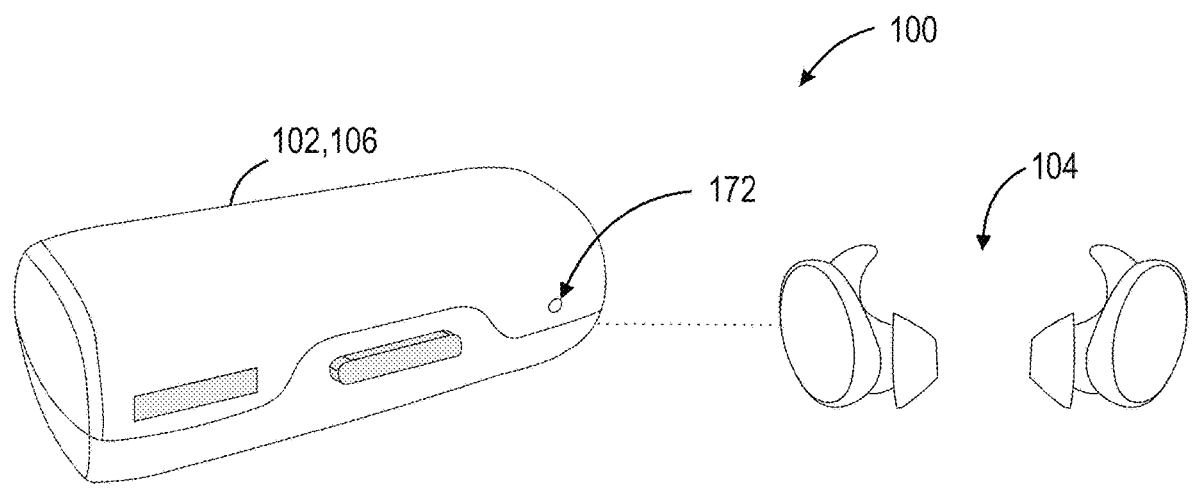
FIG. 8B is a schematic representation of a system according to the present disclosure.

In some examples, illustrated in FIGS. 8A-8B, the first BLE device 102 can also operate as a source device 106. FIG. 8A, illustrates an example where first BLE device 102 is a piece of exercise equipment, e.g., an exercise bike and the second BLE device 104 is a pair of truly wireless earbuds. In this example, first BLE device 102 can include a button, switch, touch-capacitive sensor, etc., that operates as a user input 172. Once depressed or otherwise engaged with, the user input 172 (e.g., a button positioned on the exercise bike) operates as a trigger 170, and causes the first BLE device 102 (exercise bike) to send the BLE command 162 to a second BLE device 104 (e.g., a pair of TWIE earbuds). Upon receiving the BLE command 162, the second BLE device 104 automatically attempts to establish a Bluetooth Classic connection 166 with the exercise bike, where the exercise bike operates as a source device 106. Similarly, FIG. 8B, illustrates an example where first BLE device 102 is a case configured to matingly engage with second BLE device 104. Although not shown expressly, second BLE device 104 is a pair of truly wireless earbuds that are configured to sit within formed recesses within the interior of the case and can be configured to engage with charging electrical contacts disposed on the interior of the recesses such that the case can provide an electrical charge to, e.g., second battery 142 of second BLE device 104. In this example, first BLE device 102 can include a button, switch, touch-capacitive sensor, etc., that operates as a user input 172. Once depressed or otherwise engaged with, the user input 172 (e.g., a button positioned on the case) operates as a trigger 170, and causes the case (first BLE device 102) to send the BLE command 162 to a second BLE device 104 (e.g., a pair of TWIE earbuds). Upon receiving the BLE command 162, the second BLE device 104 automatically attempts to establish a Bluetooth Classic connection 166 with the case, where the case operates as a source device 106. It should be appreciated that other source devices 106 described above can include a button, switch, touch-capacitive sensor or an on-display shortcut that would operate as a trigger 170 as described herein.

Figure 9:
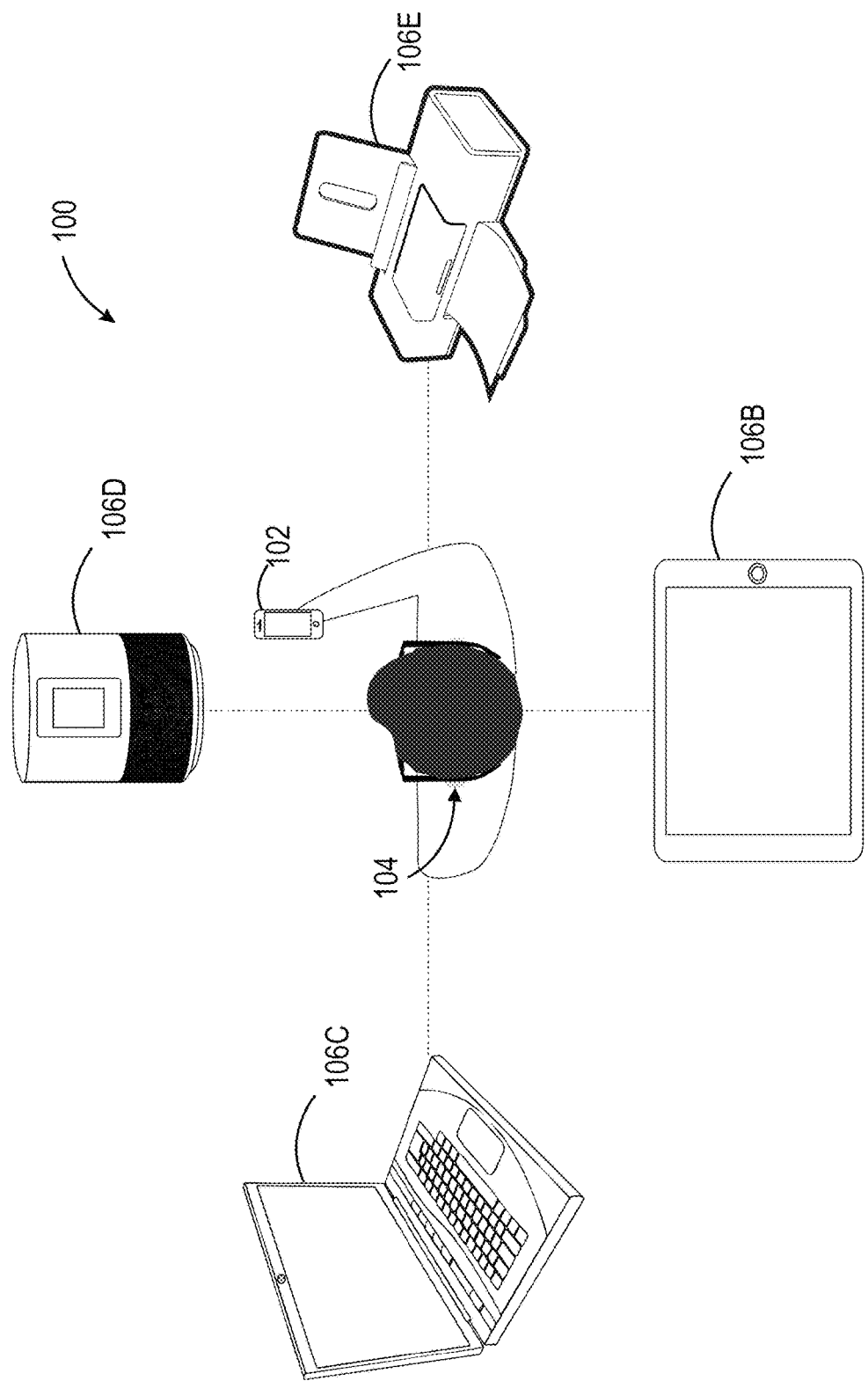
FIG. 9 is a schematic representation of a system according to the present disclosure.

As illustrated in FIG. 9, in some examples, trigger 170 can be a determined angle-of-arrival (AOA) or an angle-of-departure (AOD) of a communication received from source devices 106. For example, a user can be engaged with a first BLE device 102 (e.g., a smartphone) while wearing a second BLE device 104 (e.g., a pair of TWIE earbuds). In this arrangement, first BLE device 102 would obtain or receive the list 168 of previously paired source devices 106 including, e.g., a tablet (106B), a laptop computer (106C), a standalone speaker (106D), and a network printer (106E). Each source device 106 can periodically send data packets, e.g., advertising packets or other data, within the environment surrounding the user. Either first BLE device 102 or second BLE device 104 can receive the data packets and extrapolate the AOA or the AOD of the sent data to determine the relative position of each source device 106 with respect to the device that is evaluating the signals. For example, first BLE device 102 is configured to receive Bluetooth advertising packets from source devices 106B-106E. Upon receiving these packets, first BLE device 102 is configured to determine the AOA or AOD of each signal, and therefore the relative position of each source device 106 with respect to first BLE device 102. In this example, the direction that the user is facing, for example, toward source device 106D (e.g., a standalone speaker), indicates the user's intended target source device 106 that the user would like to establish the Bluetooth Classic connection 166 with. In other words, first BLE device 102 detects from AOA and AOD calculations that the user is facing source device 106D. By facing source device 106D, this operates as a trigger 170, which causes first BLE device 102 to send a BLE command 162 to second BLE device 104 causing second BLE device 104 to attempt to establish a Bluetooth Classic connection 166 with source device 106D. As discussed above, it should be appreciated that the AOA or AOD calculations that operate as trigger 170 can be used to switch between two available source devices 106. For example, second BLE device 104 can already be connected via a Bluetooth Classic connection 166 to source device 106B; however, upon orienting the first BLE device 102 as described above toward any of the other source devices, e.g., source devices 106C-106E, the determination that the first BLE device 102 is facing any of those source devices, while not facing or facing away from source device 106B, operates as a trigger 170 causing the first BLE device 102 to send the BLE command 162 to second BLE device 104 instructing second BLE device 104 to terminate its current Bluetooth Classic connection 166 with source device 106B and attempt to establish a new Bluetooth Classic connection 166 with the source device 106 that first BLE device 102 is currently facing.

Figure 10:
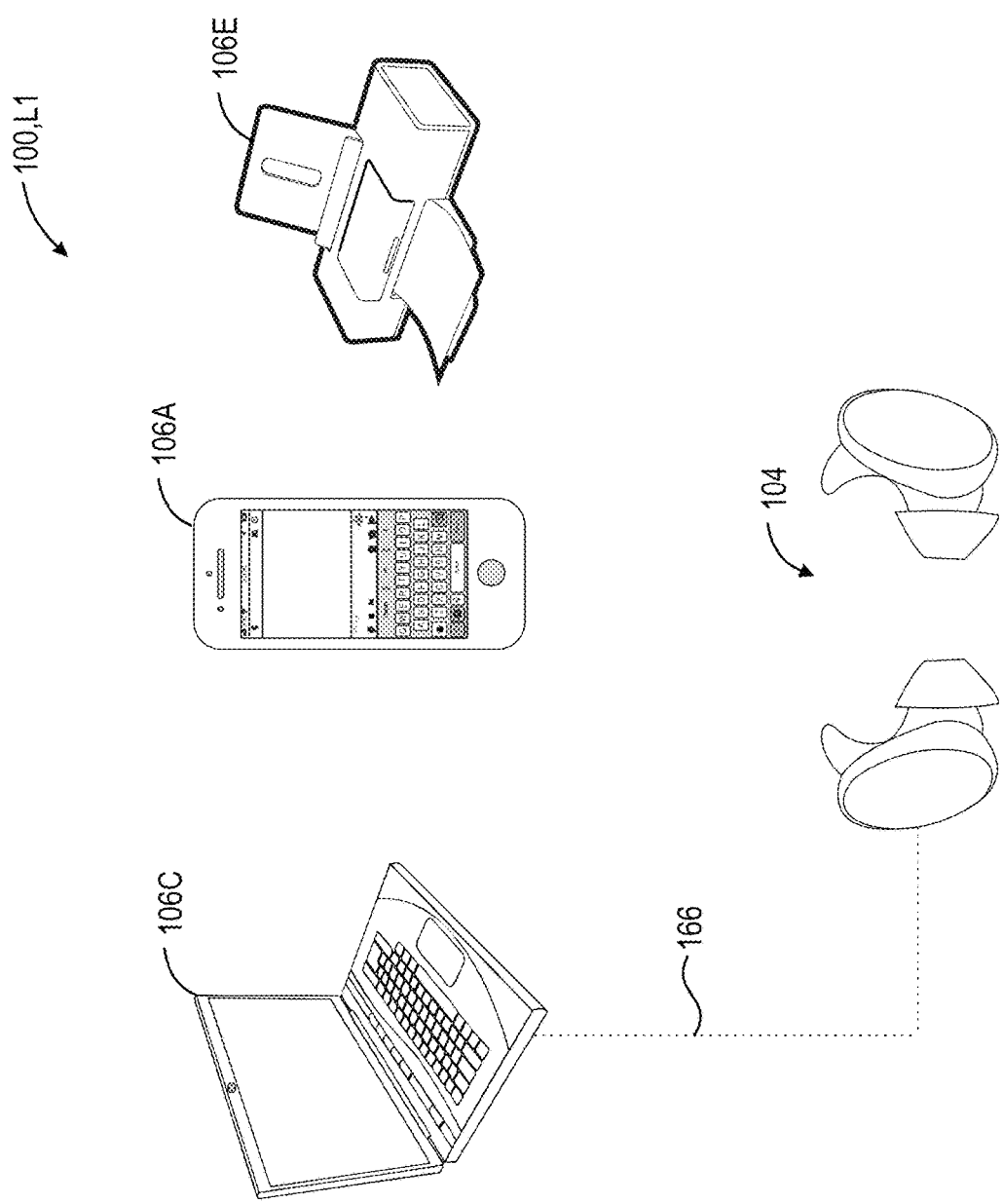
FIG. 10 is a schematic representation of a system according to the present disclosure.
Figure 11:
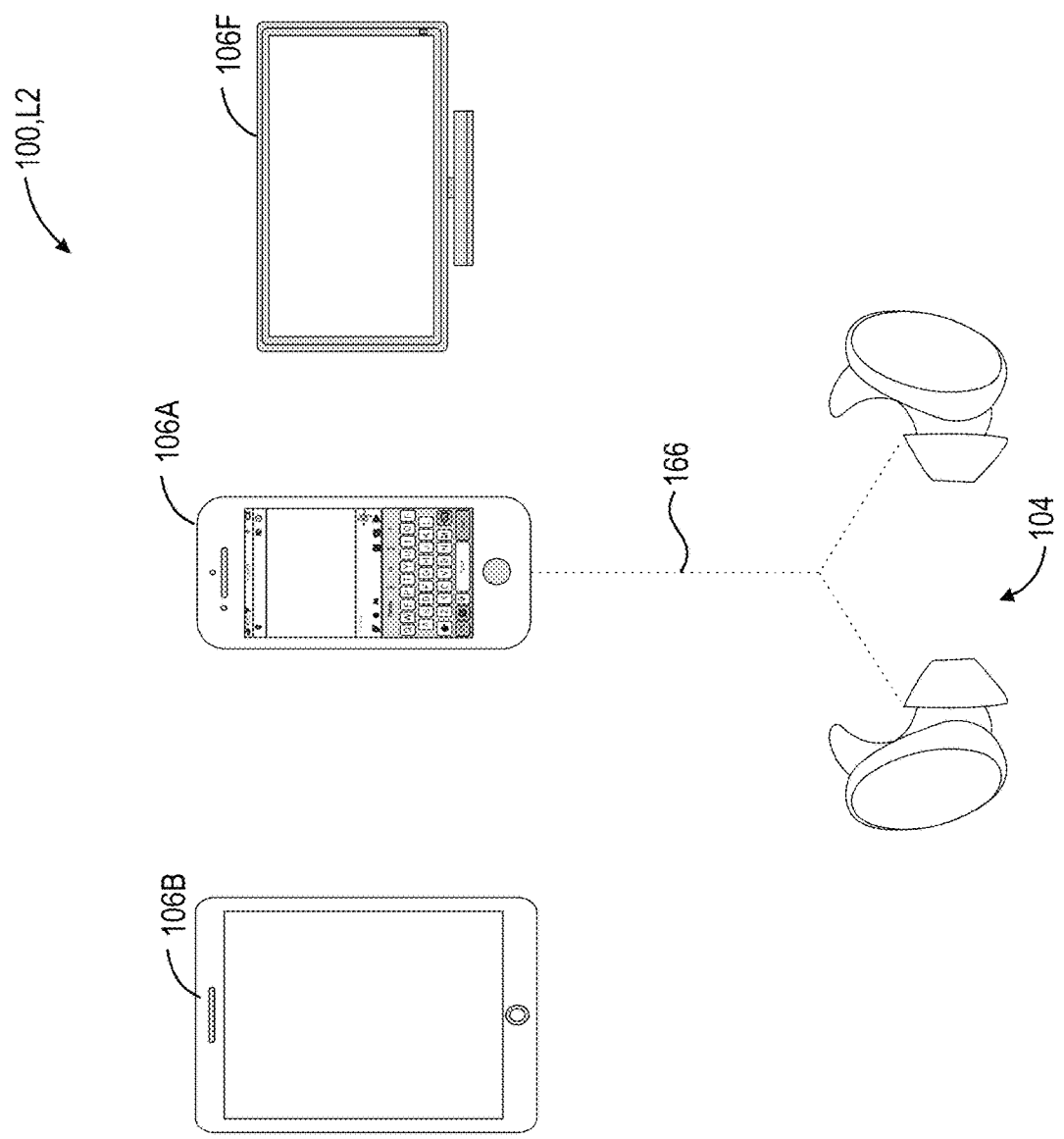
FIG. 11 is a schematic representation of a system according to the present disclosure.

Additionally, as illustrated in FIGS. 10-11, trigger 170 can include a location determination or a determination that one or more devices of system 100 has been moved from one location to another. For example, FIG. 10 illustrates a partial schematic view of system 100 within a first location L1, e.g., a user's office or work environment. In this example, first BLE device 102 (not shown) and/or second BLE device 104 can determine their absolute position using the one or more sensors S (discussed above), e.g., a GPS sensor and/or a daylight sensor, to determine that the first BLE device 102 and/or the second BLE device 104 is at first location L1 (e.g., the user's work environment) during work hours (e.g., 8 AM-6 PM). Within this environment it is anticipated that the user will prefer to establish a Bluetooth Classic connection 166 with source devices 106 typically associated with a work environment. For example, as shown, upon detecting that first BLE device 102 and/or second BLE device 104 are in the user's work environment during work hours, the detection operates as a trigger 170 and will instruct second BLE device 104 to attempt to establish a Bluetooth Classic connection 166 with the user's work laptop (e.g., source device 106C). FIG. 11 illustrates a partial schematic view of system 100 within a second location L2, e.g., a user's home environment. In this example, first BLE device 102 (not shown) and/or second BLE device 104 can determine their absolute position using the one or more sensors S (discussed above), e.g., a GPS sensor and/or a daylight sensor, to determine that the first BLE device 102 and/or the second BLE device 104 is at second location L2 (e.g., the user's home) outside of work hours (e.g., 6 PM-10 PM). Within this environment it is anticipated that the user will prefer to establish a Bluetooth Classic connection 166 with source devices 106 typically associated with a home or leisure environment. For example, as shown, upon detecting that first BLE device 102 and/or second BLE device 104 are in the user's home outside of work hours, the detection operates as a trigger 170 and will instruct second BLE device 104 to attempt to establish a Bluetooth Classic connection 166 with the user's mobile phone (e.g., source device 106A). As discussed above, it is contemplated that the one or more algorithms 174 discussed above can be integrated into the decision making process, i.e., the one or more algorithms 174 can rank order the available devices within the user's home or work environments such that upon receiving the trigger 170, the second BLE device 104 automatically connects to the source device 106 with the highest priority or rank. It should be appreciated that movement of the first BLE device 102 and/or the second BLE device 104 from the first location L1 (e.g., the user's work environment) to the second location L2 (the user's home environment) can also operate as a trigger 170.

As discussed above, upon receiving or detecting trigger 170, the first BLE device 102 sends a BLE command 162 to second BLE device 104 instructing it to attempt to establish a Bluetooth Classic connection 166 with the source device 106 selected or attempt a switch between two available source devices 106. However, should this attempt fail, second BLE device 104 can re-attempt to establish the Bluetooth Classic connection 166 with the target source device 106. In the event of a failure to establish the connection on the first attempt, or after a certain number of repeated attempts and repeated failures to establish the connection, it should be appreciated that second BLE device 104 can automatically begin attempting to establish the Bluetooth Classic connection 166 with another device of the source devices 106. In other words, should attempts to connect with the original source device 106 targeted by the BLE command 162 fail, the second BLE device 104 can begin attempting to connect with another available source device 106 from the list 168 of source devices 106.

Figure 12:
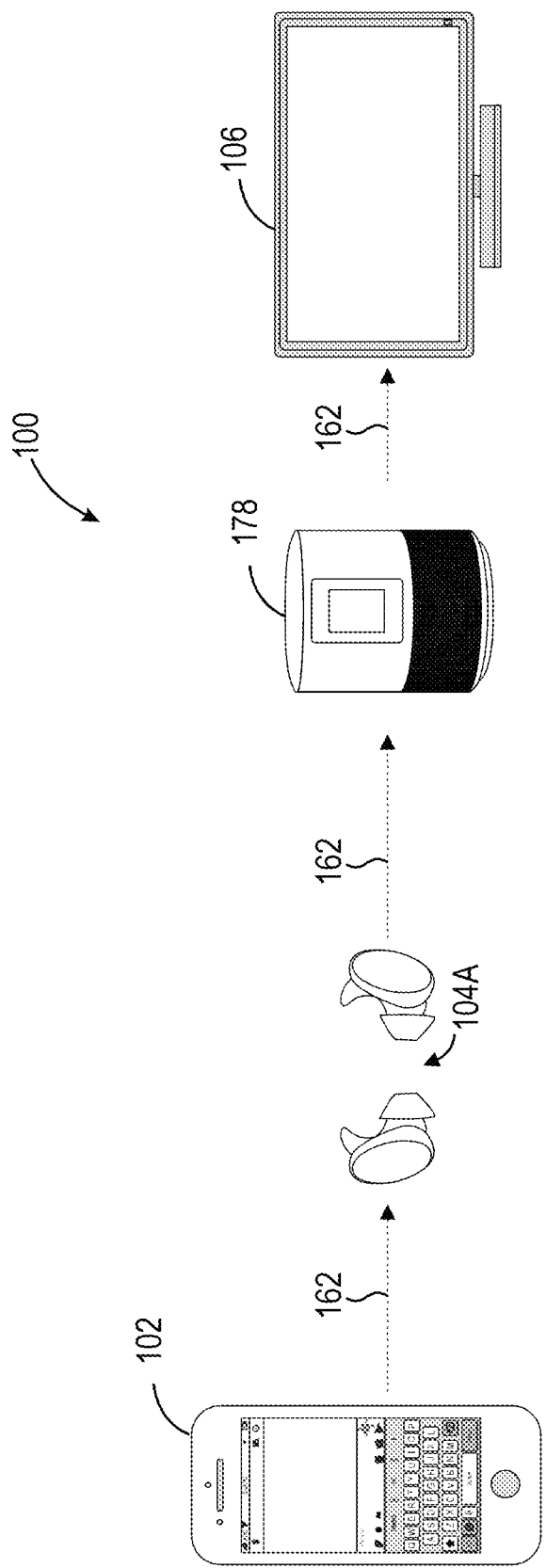
FIG. 12 is a schematic representation of a system according to the present disclosure.

In other examples as illustrated in FIG. 12, second BLE device 104 can be configured to forward or relay the BLE command 162 to a third BLE enabled device 178 (hereinafter "third BLE device 178"). For example, the BLE command 162 can be forwarded on to a third BLE device 178 where the third BLE device 178 is one of the source devices 106. For example, as shown, the user can send a BLE command 162 from a first BLE device 102 (e.g., smartphone) to a second BLE device 104A (e.g., a pair of truly wireless earbuds). Second BLE device 104A can forward the BLE command 162 on to another BLE enabled device, i.e., third BLE device 178 so that third BLE device 178 will be instructed to establish a Bluetooth Classic connection 166 with source device 106 (illustrated as a smart TV).

Figure 13:
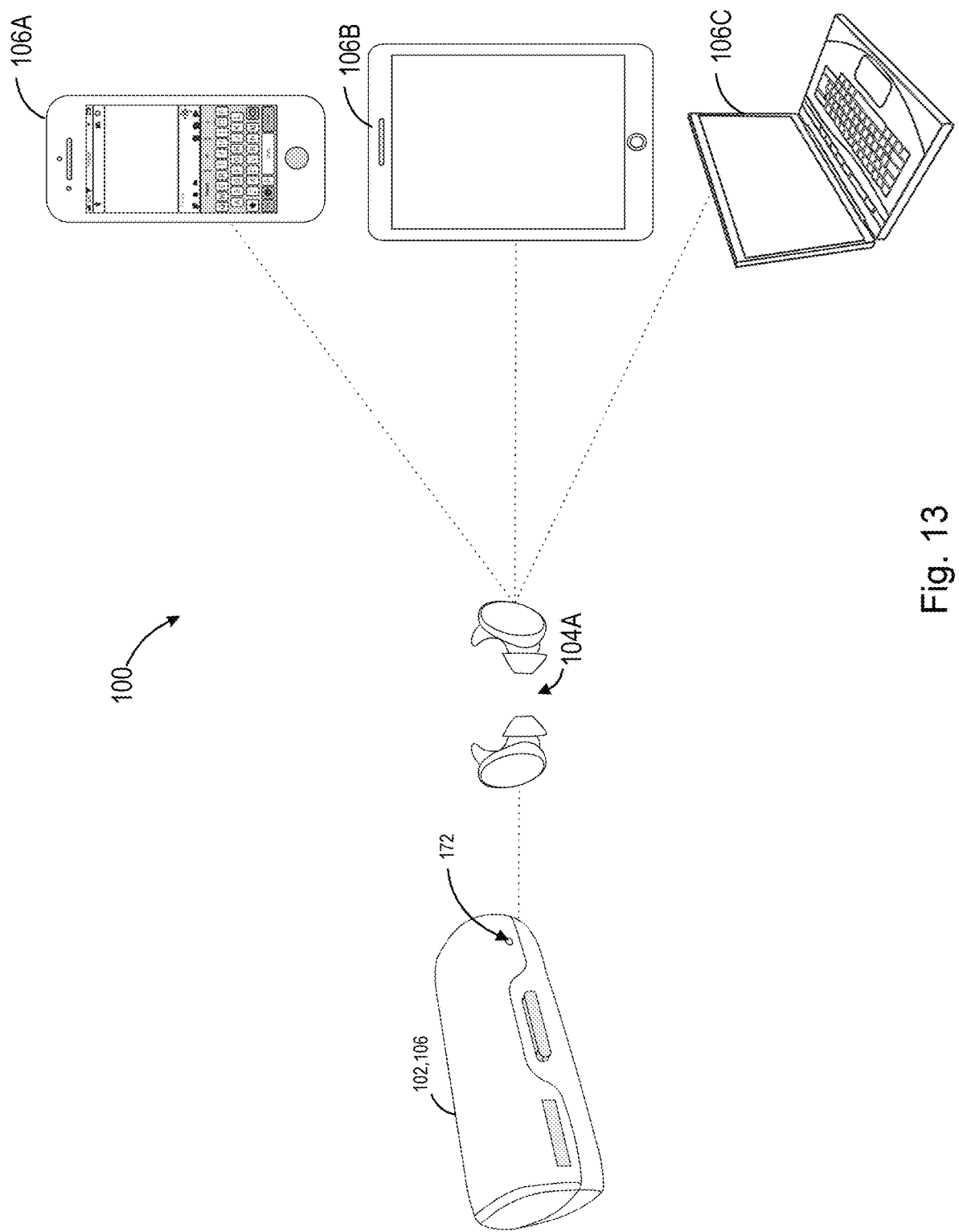
FIG. 13 is a schematic representation of a system according to the present disclosure.

Additionally, as shown in FIG. 13, it should be appreciated that a user can utilize the user input 172 of a given device within system 100 to serially cycle through available source devices 106 from the list 168 of source devices 106. For example, in a scenario where first BLE device 102 does not have a first display 122, e.g., when first BLE device 102 is a case configured to matingly engage with and/or charge the second BLE device 104, the user can provide a user input 172, e.g., via a button, switch, or touch-capacitive sensor on the case, to cycle through the available source devices 106 from the list 168 of source devices 106. As illustrated, a user can press the button (user input 172) on the case one time, and upon pressing the button a first time, first BLE device 102 (e.g., the case) will send a BLE command 162 to second BLE device 104 and second BLE device 104 will attempt to establish a Bluetooth Classic connection 166 with a first source device 106A (e.g., a smartphone). Upon successful connection, the second BLE device 104 can produce an audible tone or audio playback to the user announcing that a successful connection has been made to the user's smartphone. The audible tone can include an audio playback that announces the name of source device 106A or may include an audio playback generated from data sent over the Bluetooth Classic connection 166 with source device 106A so the user can listen to, for example, media provided by source device 106A. Thereafter, the user can press the button (user input 172) a second time. By pressing the button a second time, first BLE device 102 (case) will send a BLE command 162 to second BLE device 104 and second BLE device 104 will terminate the Bluetooth Classic connection 166 with source device 106A and attempt to establish a Bluetooth Classic connection 166 with another source device, i.e., source device 106B (illustrated as a tablet). Upon successful connection, the second BLE device 104 can produce an audible tone or audio playback to the user announcing that a successful connection has been made to the user's tablet. The audible tone can include an audio playback that announces the name of source device 106B or may include an audio playback generated from data sent over the Bluetooth Classic connection 166 with source device 106B so the user can listen to, for example, media provided by source device 106B. Moreover, the user can press the button (user input 172) a third time. By pressing the button a third time, first BLE device 102 (case) will send a BLE command 162 to second BLE device 104 and second BLE device 104 will terminate the Bluetooth Classic connection 166 with source device 106B and attempt to establish a Bluetooth Classic connection 166 with another source device, i.e., source device 106C (illustrated as a laptop). Upon successful connection, the second BLE device 104 can produce an audible tone or audio playback to the user announcing that a successful connection has been made to the user's laptop. The audible tone can include an audio playback that announces the name of source device 106C or may include an audio playback generated from data sent over the Bluetooth Classic connection 166 with source device 106C so the user can listen to, for example, media provided by source device 106C.

In addition to the foregoing, system 100 can be configured such that, the user can cycle through the list of available source devices 106 while already connected to one or more source devices 106. In this configuration, the user may manually cycle through available source devices 106 as set forth above, through multiple presses of a button of other user input 17, the user can locate a new source device 106 and after a predetermined amount of time with no further presses of the button, e.g., 2-5 seconds of inactivity, second BLE device 104 will disconnect from its current source device 106 and connect to the new source device. For example, upon pressing the button, first BLE device 102 will send BLE command 162 to second BLE device 104 instructing it to attempt to establish a Bluetooth Classic connection 166 with, e.g., source device 106A. Once the BLE command 162 is received, second BLE device 104 will attempt to establish a Bluetooth Classic connection 166 with a first source device 106A (e.g., a smartphone). Upon successful connection, the second BLE device 104 can produce an audible tone or audio playback to the user announcing that a successful connection has been made to the user's smartphone as discussed above. Thereafter, the user may provide an additional user input, that will signify that the user wishes to cycle through available source devices 106 while maintaining the connection with source device 106A. The user may engage with the user input 172 as described above to cycle through available source devices 106, e.g., source devices 106B-106C. Once the user has located the new source device, e.g., 106C, the user can perform no further action, and after 2-5 seconds of inactivity, second BLE device 104 will terminate its connection with source device 106A and attempt to establish a Bluetooth Classic connection 166 with source device 106C.

Alternatively, upon pressing or pressing and holding user input 172 (button), second BLE device 104 can automatically cycle through the available source devices for predetermined periods of time until the user presses the button again or releases the button in the event of a press and hold. For example, the user can engage with the user input 172 (e.g., a button on the case), and in response a BLE command 162 will be sent to second BLE device 104 instructing to cycle through available source devices 106 from the list 168 of source devices 106. Once the BLE command 162 is received by second BLE device 104, second BLE device 104 first attempts to establish a Bluetooth Classic connection 166 with first source device 106A. Upon successful connection, the second BLE device 104 can produce an audible tone or audio playback to the user announcing that a successful connection has been made to the user's earbuds. Additionally, for a set duration thereafter, second BLE device 104 can generate audible acoustic energy related to data sent over the Bluetooth Classic connection 166 with source device 106A so the user can listen to, for example, media provided by source device 106A. After the expiration of the short duration, e.g., after 5-10 seconds, second BLE device 104 will terminate its connection with source device 106A and attempt to establish a Bluetooth Classic connection 166 with second source device 106B. Upon successful connection, the second BLE device 104 can produce an audible tone or audio playback to the user announcing that a successful connection has been made to the user's tablet. Additionally, for a set duration thereafter, second BLE device 104 can generate audible acoustic energy related to data sent over the Bluetooth Classic connection 166 with source device 106B so the user can listen to, for example, media provided by source device 106B. After the expiration of the additional duration, e.g., after 5-10 seconds, second BLE device 104 will terminate its connection with source device 106B and attempt to establish a Bluetooth Classic connection 166 with second source device 106C. Upon successful connection, the second BLE device 104 can produce an audible tone or audio playback to the user announcing that a successfully connection has been made to the user's laptop. Additionally, for a set duration thereafter, second BLE device 104 can generate audible acoustic energy related to data sent over the Bluetooth Classic connection 166 with source device 106C so the user can listen to, for example, media provided by source device 106C. At any time during the automatic cycling through of the source devices 106A-106C, the user can engage with the user input 172 again (e.g., press the button on the case), and the second BLE device 104 will cease automatically cycling through available source devices 106 and will stay connected to the source device that it is currently connected to.

Figure 14:
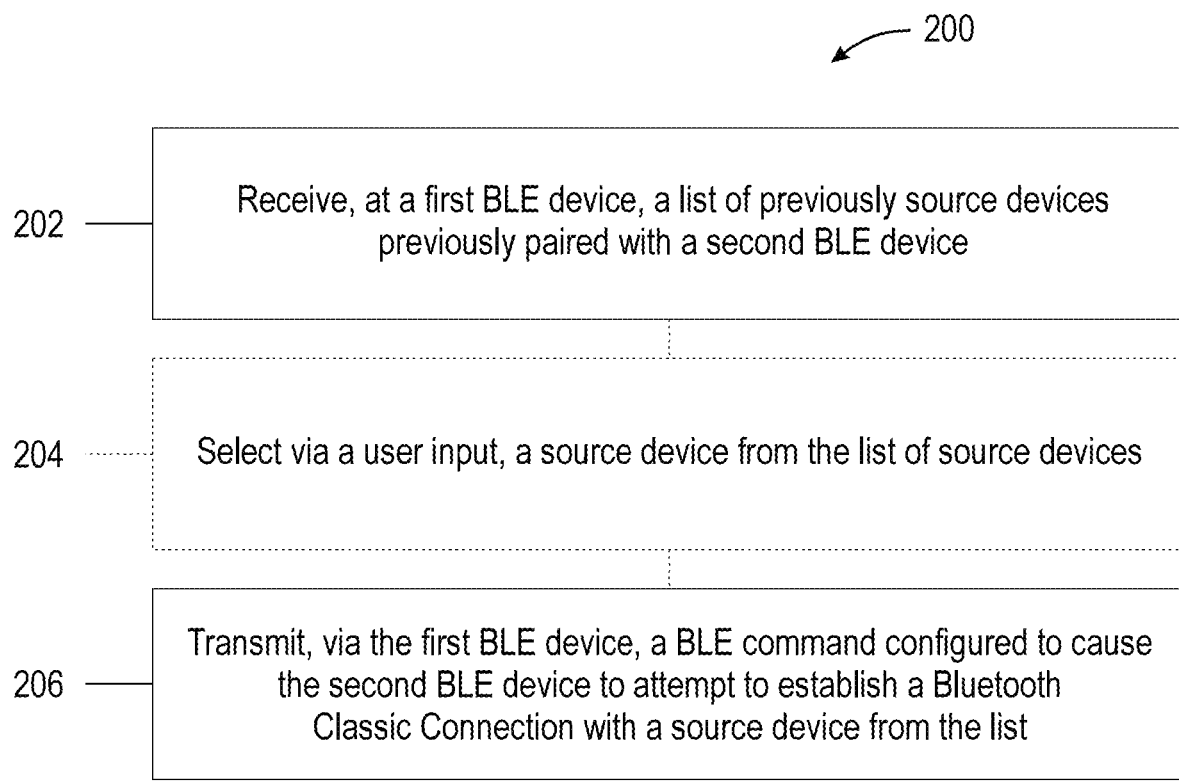
FIG. 14 is a flow chart illustrating exemplary steps of a method according to the present disclosure.

FIG. 14 illustrates a flow chart showing exemplary steps of a method 200 according to the present disclosure. As illustrated, method 200 can include, for example: receiving, at a first Bluetooth Low Energy (BLE) enabled device 102, a list 168 of one or more source devices 106 paired with a second BLE enabled device 104 (step 202). Optionally, the source device 106 can be selected via a user input 172 from the list 168 of one or more source devices 106 (step 206). The method also includes transmitting, in response to a trigger 170, a BLE command 162 configured to cause the second BLE enabled device 104 to attempt to establish a Bluetooth Classic connection 166 with a source device 106 from the list 168 of one or more source devices 106 paired with the second BLE enable device 104 (step 206).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of establishing device connections, the method comprising:
   receiving, at a first Bluetooth Low Energy (BLE) enabled device, a list of a plurality of source devices paired with a second BLE enabled device, wherein the list is transmitted by the second BLE enabled device via a BLE connection; and
   transmitting, in response to a trigger, a BLE command from the first BLE enabled device to the second BLE enabled device, wherein the BLE command is configured to cause the second BLE enabled device to attempt to establish a Bluetooth Classic connection with a source device from the list of the plurality of source devices paired with the second BLE enabled device.

2. The method of claim 1, wherein the first BLE enabled device does not have any other connection to the second BLE enabled device when the transmitting of the BLE command is performed.

3. The method of claim 1, wherein the first BLE enabled device is a mobile computing device.

4. The method of claim 1, wherein the first BLE enabled device is a case that is configured to matingly engage with the second BLE enabled device and/or configured to charge a battery of the second BLE enabled device.

5. The method of claim 1, wherein the second BLE enabled device is a wearable audio device.

6. The method of claim 1, wherein the second BLE enabled device is a speaker.

7. The method of claim 1, wherein the second BLE enabled device is configured to relay the BLE command to a third BLE enabled device.

8. The method of claim 1, wherein, in response to the second BLE enabled device being unable to establish the Bluetooth Classic connection with a first source device from the list of the plurality of source devices, the second BLE enabled device is configured to attempt to connect to a second source device from the list of the plurality of source devices.

9. The method of claim 1, wherein, after receiving the list of the plurality of source devices and before transmitting the BLE command, the method further comprises:
   selecting, via user input, the source device from the list of the plurality of source devices.

10. The method of claim 9, wherein the user input includes a tap and hold input on a display of the first BLE enabled device.

11. The method of claim 1, wherein the trigger is selected from at least one of: detection of the first BLE enabled device to within a first location; detection of the second BLE enabled device within the first location; detection of the first BLE enabled device being moved from the first location to a second location different than the first location; a time of day;
   detection that the plurality of source devices of the list of the plurality of source devices is within a wireless communication range of the first BLE enabled device; and detection of the activation of a user input.

12. The method of claim 1, wherein the first BLE enabled device is configured to implement one or more algorithms arranged to generate the list of the plurality of source devices based on user behavior.

13. The method of claim 12, wherein the plurality of algorithms determines a relative angle-of-departure and/or a relative angle-of-arrival between the second BLE enabled device and the plurality of source devices of the list of the plurality of source devices.

14. The method of claim 1, wherein the first BLE enabled device is configured to display a favorites list that includes the plurality of source devices from the list of the plurality of source devices.

15. The method of claim 1, wherein the first BLE enabled device is the source device from the list of the plurality of source devices, and wherein the first BLE enabled device includes a user input, and wherein, the trigger includes activation of the user input such that, when the user input is activated, the first BLE enabled device is configured to send the BLE command to the second BLE enabled device and cause the second BLE enabled device to attempt to establish the Bluetooth Classic connection with the first BLE enabled device.

16. A Bluetooth Low Energy (BLE) enabled device comprising:
   a BLE radio; and
   a processor and memory configured to execute and store, respectively, a set of computer-readable instructions that when executed by the processor are configured to:
      transmit a BLE command via the BLE radio to request a list of a plurality of source devices paired with another BLE enabled device, wherein the list is transmitted by the other BLE enabled device via a BLE connection; and
      transmit, in response to a trigger, a BLE command from the BLE enabled device to the other BLE enabled device such that the other BLE enabled device attempts to establish a Bluetooth Classic connection with a source device from the list of the plurality of source devices paired with the other BLE enabled device.

17. The BLE enabled device of claim 16, wherein the BLE enabled device does not have any other connection to the other BLE enabled device when the transmitting of the BLE command is performed.

18. The BLE enabled device of claim 16, wherein after transmitting the request and before transmitting the BLE command, the processor is further configured to:
   receive a user input; and
   select, based on the user input, the source device from the list of the plurality of source devices.

19. The BLE enabled device of claim 16, wherein the trigger is selected from at least one of: detection of the BLE enabled device to within a first location; detection of the other BLE enabled device within the first location; detection of the BLE enabled device being moved from the first location to a second location different than the first location; a time of day;

detection that the plurality of source devices of the list of the plurality of source devices is within a wireless communication range of the BLE enabled device; and detection of the activation of a user input.

20. The BLE enabled device of claim 16, wherein the BLE enabled device is configured to implement the plurality of algorithms arranged to generate the list of the plurality of source devices based on user behavior.

\* \* \* \* \*